(12) United States Patent  (10) Patent No.: US 7,992,949 B2
Krause et al.  (45) Date of Patent: Aug. 9, 2011

(54) MECHANICAL SAFETY BRAKE FOR A MOBILE STORAGE SYSTEM

(75) Inventors: Sean R. Krause, Fort Atkinson, WI (US); Steven M. Lehmann, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 603 days.

(21) Appl. No.: 12/111,730

(22) Filed: Apr. 29, 2008

(65) Prior Publication Data

US 2008/0264736 A1  Oct. 30, 2008

Related U.S. Application Data

(60) Provisional application No. 60/914,875, filed on Apr. 30, 2007.

(51) Int. Cl.
 *A47B 53/00* (2006.01)
(52) U.S. Cl. ...................................... 312/201
(58) Field of Classification Search .......... 312/198–201, 312/319.1, 319.2; 188/31; 104/178
 See application file for complete search history.

(56) References Cited

U.S. PATENT DOCUMENTS

| | | | |
|---|---|---|---|
| 3,961,831 A | 6/1976 | Showell et al. | |
| 4,256,355 A | 3/1981 | Yamaguchi et al. | |
| 4,307,922 A | 12/1981 | Rhodes, Jr. | |
| 4,467,924 A | 8/1984 | Morcheles | |
| 4,557,534 A * | 12/1985 | Dahnert | 312/201 |
| 4,607,896 A | 8/1986 | Peterman | |
| 4,615,449 A | 10/1986 | Naito et al. | |
| 4,616,888 A | 10/1986 | Peterman | |
| 4,616,889 A | 10/1986 | Peterman | |
| 4,693,184 A | 9/1987 | Peterman | |
| 4,744,307 A | 5/1988 | Peterman et al. | |
| 4,745,516 A | 5/1988 | Griffin | |
| 5,069,513 A | 12/1991 | Farrell et al. | |
| 5,160,189 A | 11/1992 | Johnston et al. | |
| 5,360,262 A * | 11/1994 | Davidian | 312/201 |
| 5,401,090 A * | 3/1995 | Muth et al. | 312/201 |
| 5,435,639 A | 7/1995 | Smits et al. | |
| 5,669,682 A * | 9/1997 | Janson | 312/201 |
| 5,842,585 A | 12/1998 | Hollander | |
| 6,814,245 B2 | 11/2004 | Leclerc et al. | |
| 6,845,721 B1 | 1/2005 | Doucet et al. | |
| 7,043,810 B2 | 5/2006 | Bober | |
| 7,645,000 B2 | 1/2010 | Rainville | |
| 2005/0279464 A1 | 12/2005 | O'Brien | |
| 2007/0252491 A1 | 11/2007 | Rainville | |

OTHER PUBLICATIONS

"Floor Level Safety System For Mechanical Moving Shelving", Cat. No. KOM370, 5M/12-93/RPC, Kardex.

* cited by examiner

*Primary Examiner* — Janet M Wilkens
(74) *Attorney, Agent, or Firm* — Andrus, Sceales, Starke & Sawall, LLP

(57) ABSTRACT

A mechanical safety braking device for use with a mobile storage unit forming a part of the mobile storage system. The device includes an actuating member disposed on a mobile storage unit that is operably connected to a braking mechanism engaged with a motive system for the mobile storage unit. When the actuating member is engaged, the mechanical connection between the actuating member and the braking mechanism causes the braking mechanism to slow and ultimately cease the operation of the motive system and consequent movement of the mobile storage unit.

20 Claims, 10 Drawing Sheets

2

MECHANICAL SAFETY BRAKE FOR A MOBILE STORAGE SYSTEM

CROSS-REFERENCE TO RELATED APPLICATIONS

This application claims priority from U.S. Provisional Patent Application Ser. No. 60/914,875, filed Apr. 30, 2007, the entirety of which is expressly incorporated by reference herein.

FIELD OF THE INVENTION

The present invention relates to mobile storage systems, and more specifically to a safety braking device utilized with a mobile storage system.

BACKGROUND OF THE INVENTION

Mobile storage systems have long been utilized to store documents, books and other items in a high density manner that also allows for easy access to the items contained on any portion of the mobile storage system. These systems typically include a number of storage units movably mounted on rails that are secured to the floor of a room or other enclosure. By operation of a motive system associated with each of the storage units, individual units may be moved along the rails to expose a desired unit in order to retrieve the items contained therein.

The motive system selected for these types of storage units can be either a mechanical system or an electrical system. With a mechanical motive system, each storage unit is moved by manually activating the mechanical mechanism, such as a hand crank. The crank or other manual activation means is disposed directly on the individual storage unit, and is mechanically connected to wheels on the storage unit to move those wheels and the storage unit along the rails.

With regard to the electrical motive systems used for the storage units, the system is activated by utilizing a switch that is operably connected to an electrically-powered motor connected to wheels for the storage unit. The activation of the motor then causes the wheels of the storage unit to rotate in the selected direction to move the storage unit in the desired direction.

A number of safety devices have been developed for use with mobile storage systems in order to prevent adjacent storage units from inadvertently being moved towards one another when a person or other object is positioned between the storage units. Many prior art safety devices designed for use with storage units in storage systems of this type are electrically operated safety devices that are integrated with a motor-operated drive system that moves the individual storage units along the rails during operation of the system.

While safety devices of this type function satisfactorily, it is necessary to supply electrical power to the storage unit in order to power the safety device. This is not a concern in a motor-operated systems, since each storage unit is supplied with electrical power in order to power the motor-operated drive system, unless there is a loss of power. When power is lost, however, the motor also ceases to function such that the storage unit is unable to move.

In mobile storage systems that have a mechanical drive system, the motive power is manually supplied by a user. As such, systems of this type do not require the supply of electrical power to the storage units so that the electrically powered-safety devices are not able to be utilized effectively. In particular, in those situations where the power supply to the electrical safety device is interrupted, unlike those storage units where the unit is moved by an electrically-powered motor, the manual input still enables the storage unit to move as directed by an individual, which can result in an unsafe condition.

As a result, it is desirable to develop a safety braking device for a storage units used in a mobile storage system that, while capable of providing the desired safety braking feature to the individual units within the storage system, does not require electrical power and also has a relatively simple construction for easy incorporation with the storage units, whether mechanically or electrically operated.

SUMMARY OF THE INVENTION

According to one aspect of the present invention, a mechanical safety braking device is provided for attachment to an individual storage unit of a mobile storage system that operates to stop the operation of the motive system for the storage unit upon activation of the device. The mechanical safety braking device includes an actuator disposed in an easily accessible location on the exterior of each storage unit that is used to activate the device. The actuator is, in turn, connected to a connecting member, such as a cable or other suitable member, that extends from the actuator to an engagement mechanism disposed adjacent to the motive system for the storage unit. The engagement mechanism, upon activation of the mechanical safety braking device using the actuator, directly engages the motive system for the storage unit, consequently stopping the operation of the motive system and inhibiting any further movement of the storage unit until the actuator is released.

According to another aspect of the present invention, the mechanical safety braking device has a relatively simple construction that can be easily incorporated into the construction of new storage units, or can be retrofit onto existing storage units.

According to still another aspect of the present invention, the mechanical safety braking device can be employed with either a mechanical or an electrical motive system because no electric power is required for the operation of the braking device.

Various other features, objects and advantages of the invention will be made apparent from the following description taken together with the drawings.

BRIEF DESCRIPTION OF THE DRAWINGS

The drawings illustrate the best mode currently contemplated of practicing the present invention.

In the drawings.

DETAILED DESCRIPTION OF THE INVENTION

Figure 3:
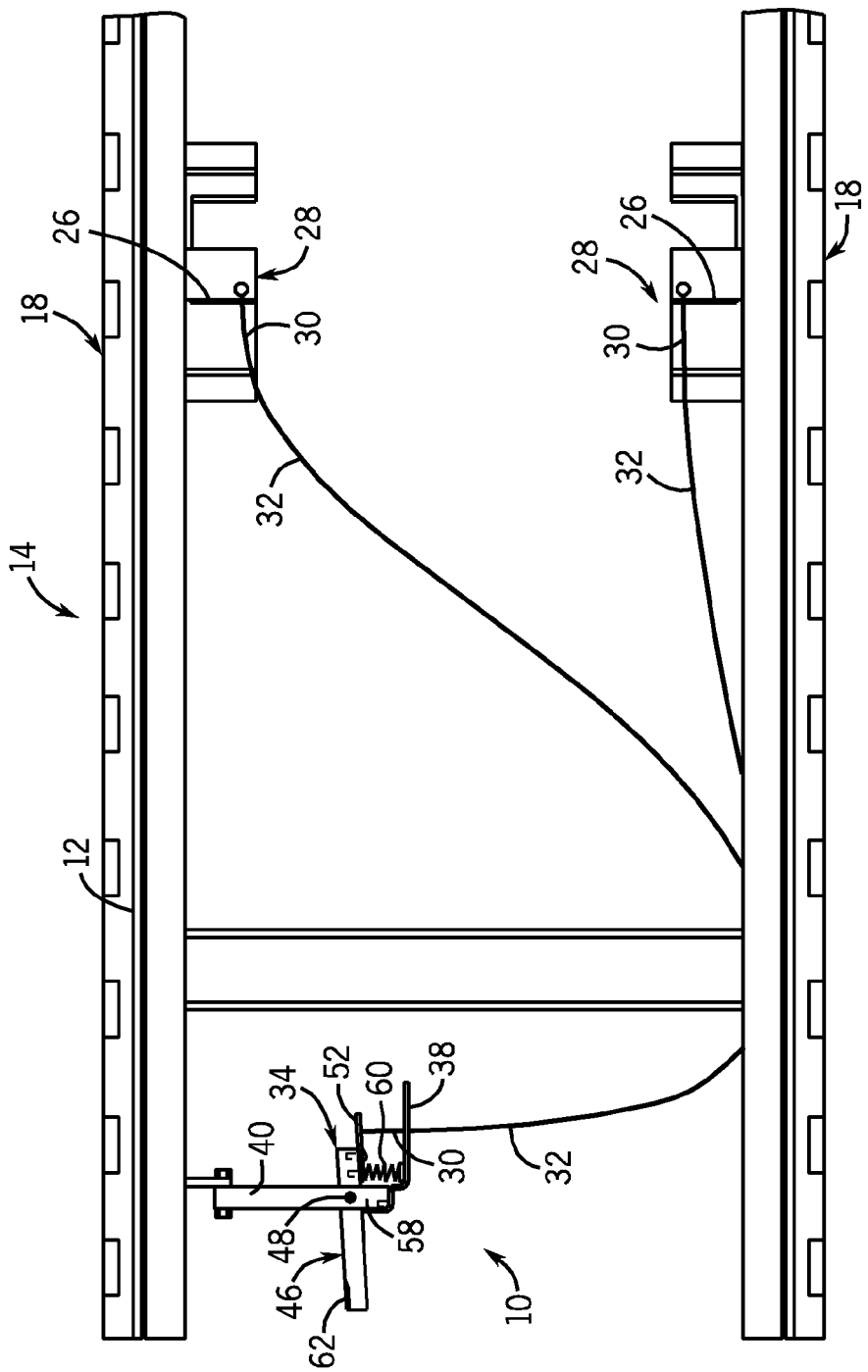
FIG. 3 is a partial top plan view showing the components of the mechanical safety braking device in accordance with the present invention as incorporated into a carriage of a storage unit as shown in FIG. 1.

With reference now to the drawing figures in which like reference numerals designate like parts throughout the disclosure, a mechanical safety braking device constructed according to the present invention is indicated generally at 10 in FIG. 3. The mechanical safety braking device 10 is mounted to a frame 12 of a mobile storage unit carriage 14, and is interconnected with a motive system 16 (FIG. 9) for the storage unit carriage 14. In a manner as is known, each carriage 14 is configured to support a series of storage units such as shelves, cabinets, etc., shown at S in FIG. 1.

Figure 1:
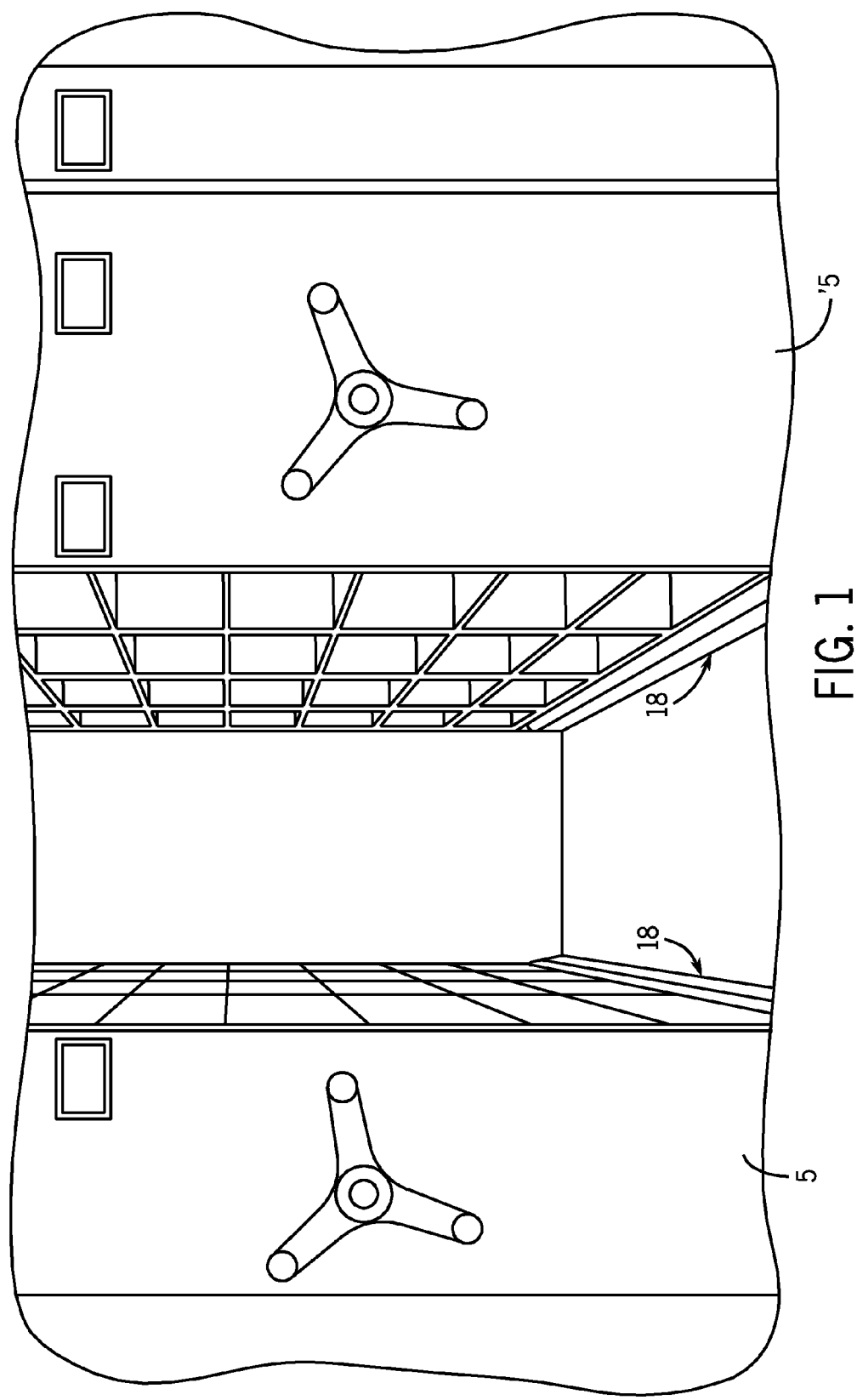
FIG. 1 is an isometric view of a mobile storage system including a number of mobile storage devices each incorporating the mechanical braking safety device constructed according to the present invention.
Figure 2:
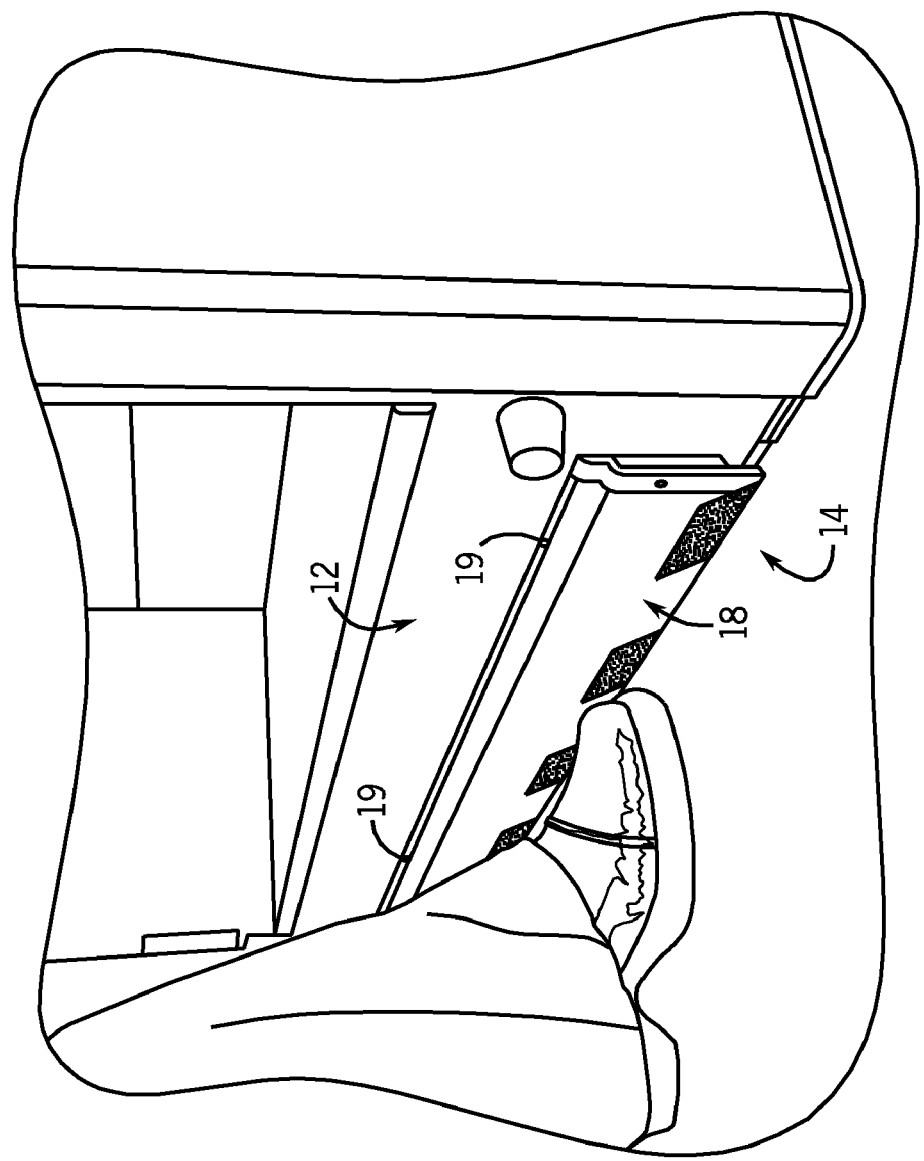
FIG. 2 is a partially broken away isometric view of an actuating member of the mechanical braking safety device incorporated in a storage unit as shown in FIG. 1.
Figure 4:
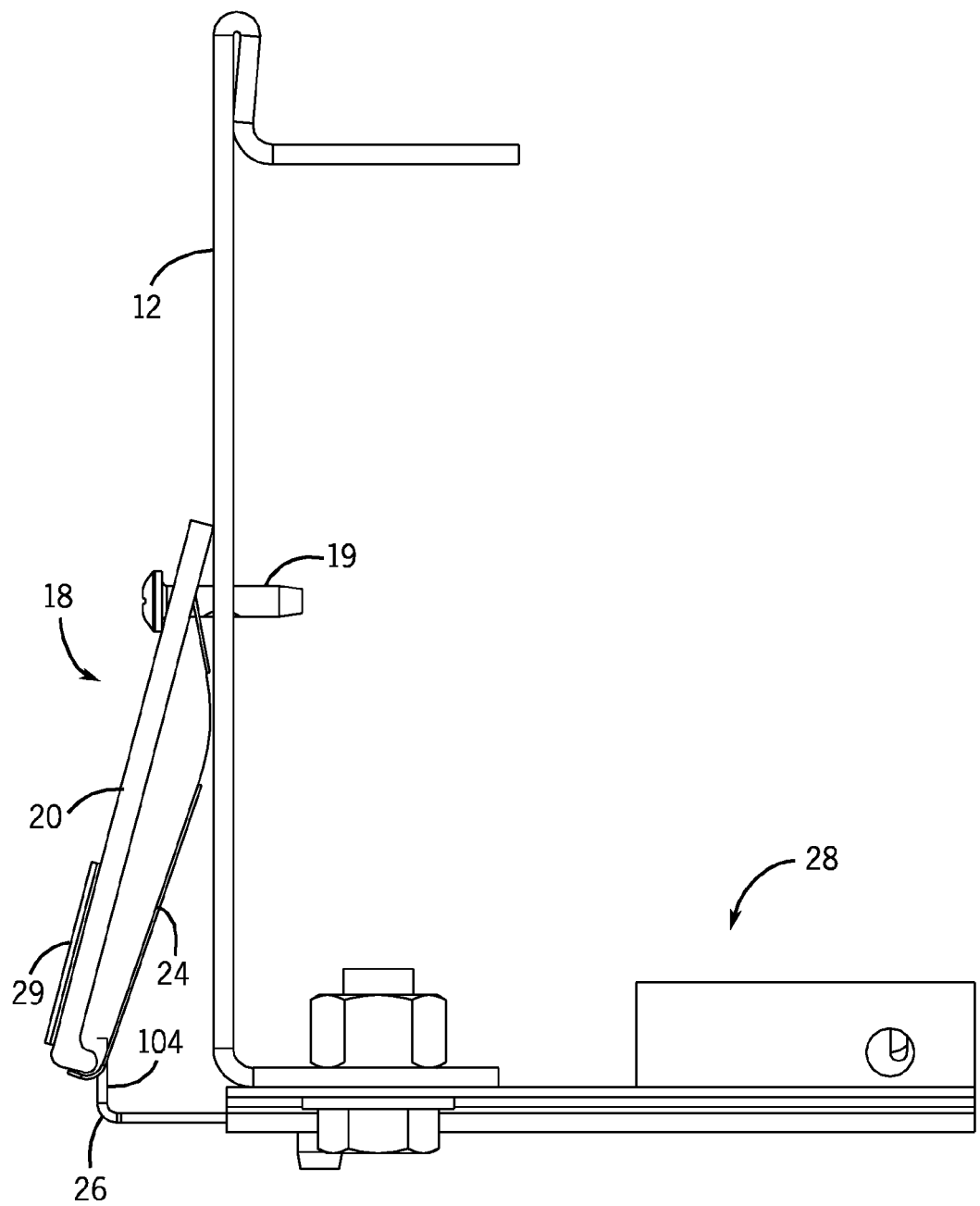
FIG. 4 is a partially broken away, cross-sectional view of the actuating member of FIG. 2.
Figure 5:
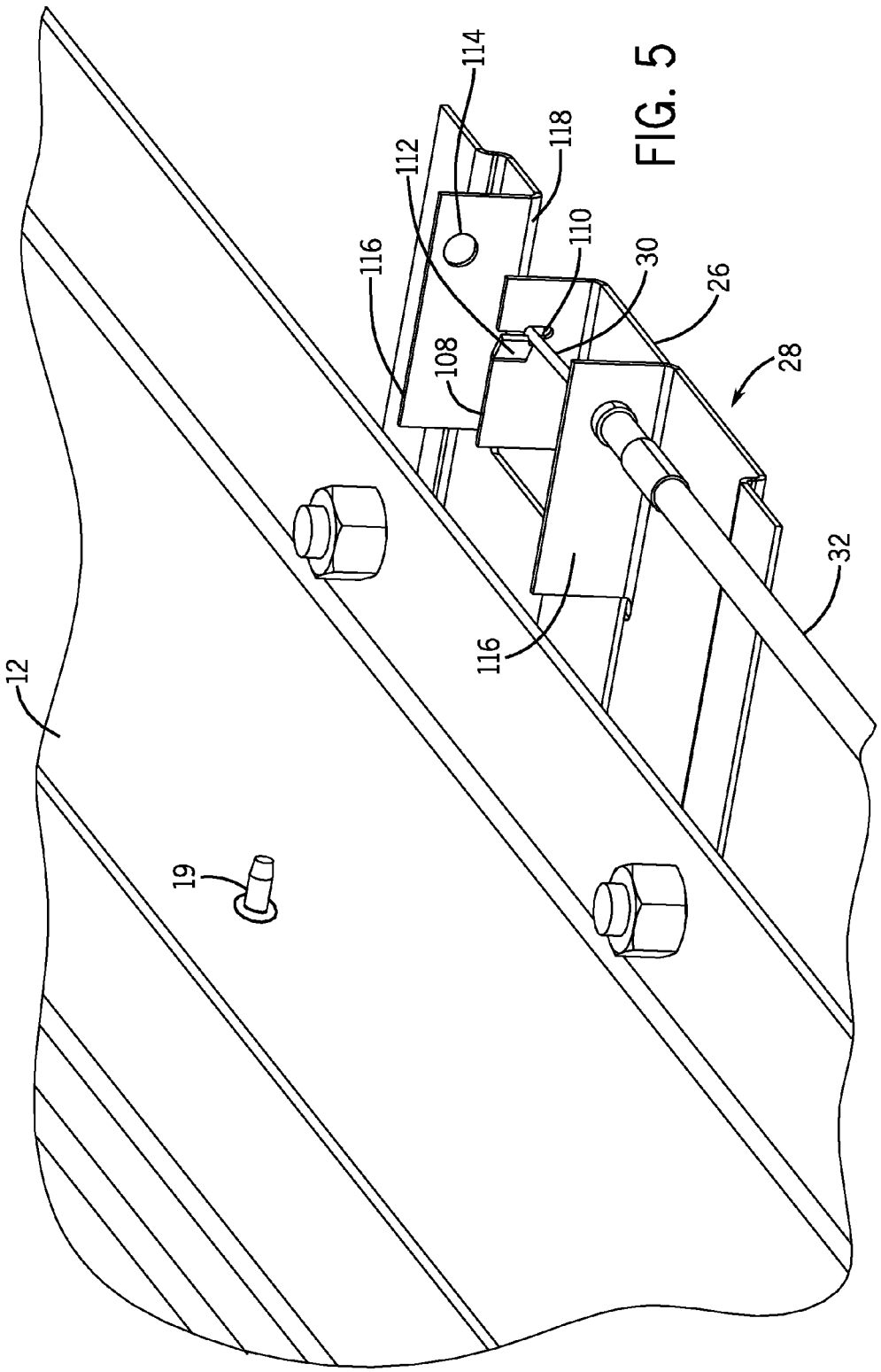
FIG. 5 is a partial isometric view of an actuating device incorporated into the mechanical safety braking device in accordance with the present invention, in which the actuating device is mounted to a carriage of a storage unit as shown in FIG. 1, and showing the actuating device in an inactivated position.
Figure 6:
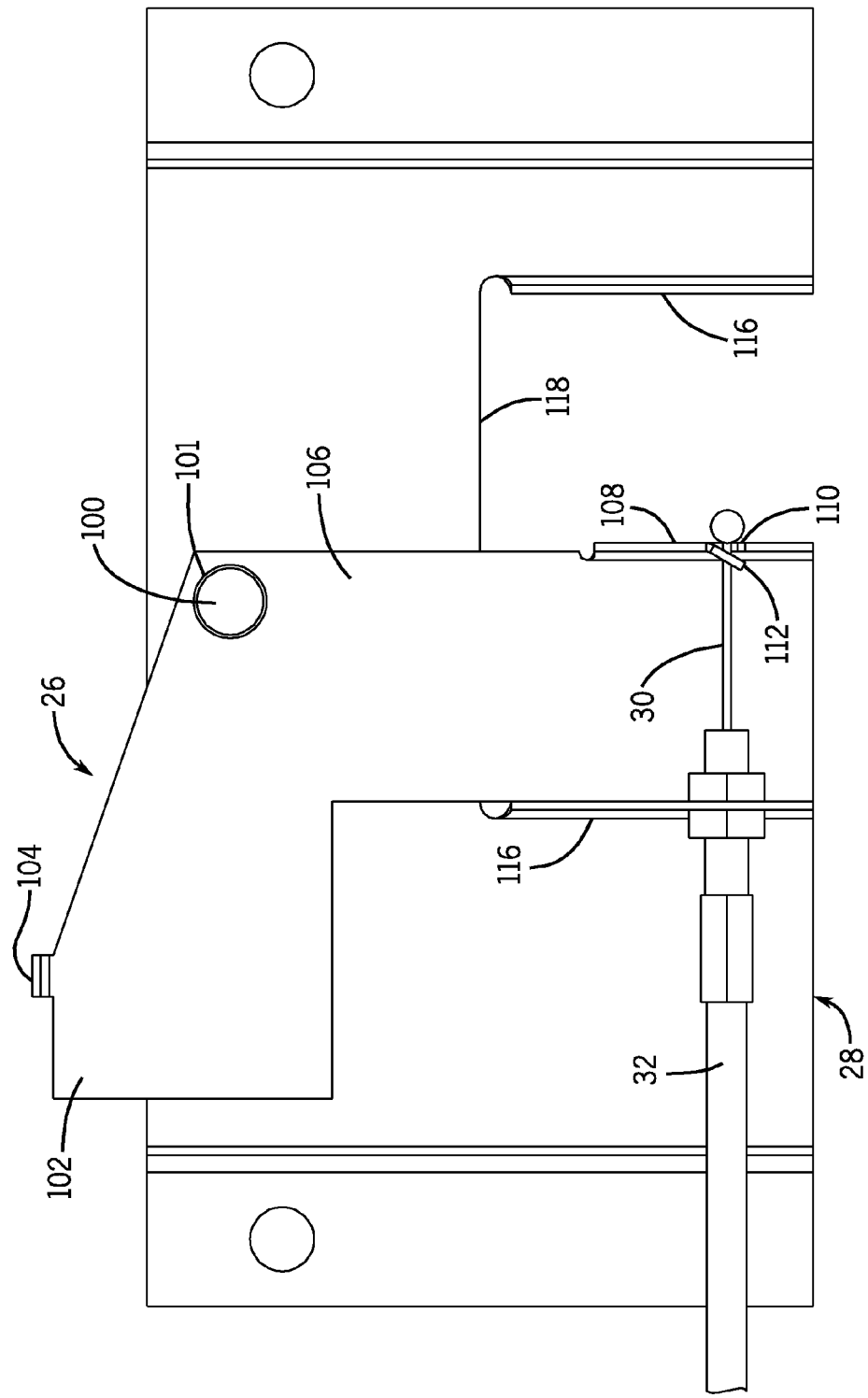
FIG. 6 is a top plan view of the actuating device of FIG. 5, showing the actuating device in the inactivated position.

Referring now to FIGS. 1-3, the safety device 10 includes a suitable actuating member 18, such as a kick plate, that is mounted to the exterior of the carriage frame 12, and preferably to the bottom of the carriage frame 12 or some other readily and easily accessible location. The actuating member 18 can be formed from a suitably rigid material as a single member or as multiple members attached to the frame 12, with the actuating member(s) 18 fixedly connected at one end to the frame 12 by a series of suitable fasteners 19 inserted through one end of the actuating member 18 and secured to the frame 12. In one preferred embodiment as shown in FIG. 4, the actuating number 18 is formed as a relatively rigid L-shaped member 20, which has sufficient strength and rigidity to be moved inwardly along its length when it strikes an object in the aisle between storage units S. The actuating member 18 includes an inwardly facing spring member 24, which extends from the end of the L-shaped member 20 to which the fastener 19 is attached and is secured to the outer end of the L-shaped member 20. When the actuating member 18 is secured to the frame 12, the spring member 24 engages the frame 12 and biases the actuating member 18 away from the frame 12. The L-shaped member 20 may also include a bumper strip 29 at its lower end, which may be in the form of a length of safety tape, and which defines the lowermost and outermost extent of the actuating member 18 and is adapted to be engaged by an object supported on a floor or other supporting surface to which the carriage 14 is mounted.

Referring now to FIGS. 4-8, at its lower end, the actuating member 18 is engaged with the outer end of a pivoting actuator plate 26 that is affixed to an actuator support 28 carried by the frame 12, by means of a pivot pin 100 secured to the plate 26 within an aperture 101 formed in the plate 26. The pivoting actuator plate 26 includes an outer portion 102 that extends beneath the frame 14 and outwardly beyond the support plate 28 into contact with the actuating member 18. An engagement tab 104 is positioned on the outer portion 102 and forms the point of engagement of the outer portion 102 with the actuating member 18. The pivoting actuator plate 26 is connected to one end of a connecting member 30, such as a cable or other suitable connecting means, that is disposed within and extends through a sheath 32 mounted at one end to the actuator support 28. The movement of the pivoting actuator plate 26 in response to the movement of the actuating member 18 operates to pull the connecting member or cable 30 outwardly from the sheath 32, for a purpose to be described.

Connected to the outer portion of the pivoting actuator plate 102 is an inner portion 106 that extends inwardly at a right angle relative to the outer portion 102. The inner portion 106 includes a securing flange 108 extending upwardly from one side of the inner portion 106. The securing flange 108 includes a notch 110 formed therein. The upper portion of the notch 110 is partially obstructed by a locking flange 112 that functions to hold the cable 30 in connection with the flange 108 by forcing the cable 30 to be bent around the flange 112 in order to pass the cable 30 into the notch 110. In the inactivated position for the safety device 10, best shown in FIGS. 5 and 6, the notch 110 is positioned substantially in alignment with a cable aperture 114 located in a guide flange 116. The guide flange 116 extends upwardly from the actuator support 28 on one side of a notch 118 formed in the actuator support 28. In this position, the guide flange 116 and the securing flange 108 are positioned generally parallel to one another. In the activated position for the device 10, best shown in FIGS. 7 and 8, the pivoting actuator plate 26 is pivoted about the pin 100 as a result of contact with the associated actuating member 18, which moves the securing flange 108 away from the guide flange 116. This consequently draws the cable 30 secured to the flange 108 out of the sheath 32 secured to the guide flange 116 to activate the device 10.

Figure 9:
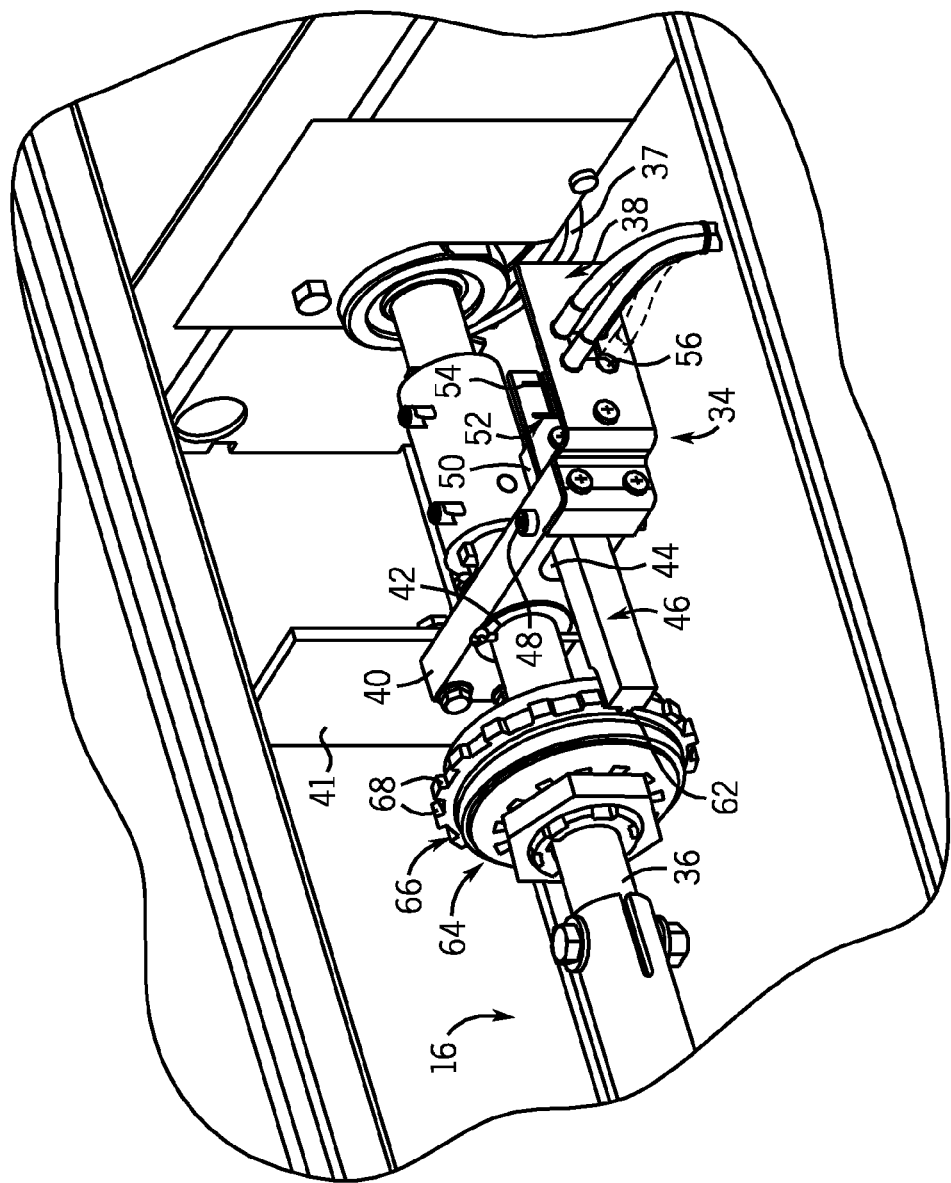
FIG. 9 is a partial isometric view showing the braking arrangement of the mechanical safety braking device as shown in FIG. 2.
Figure 10:
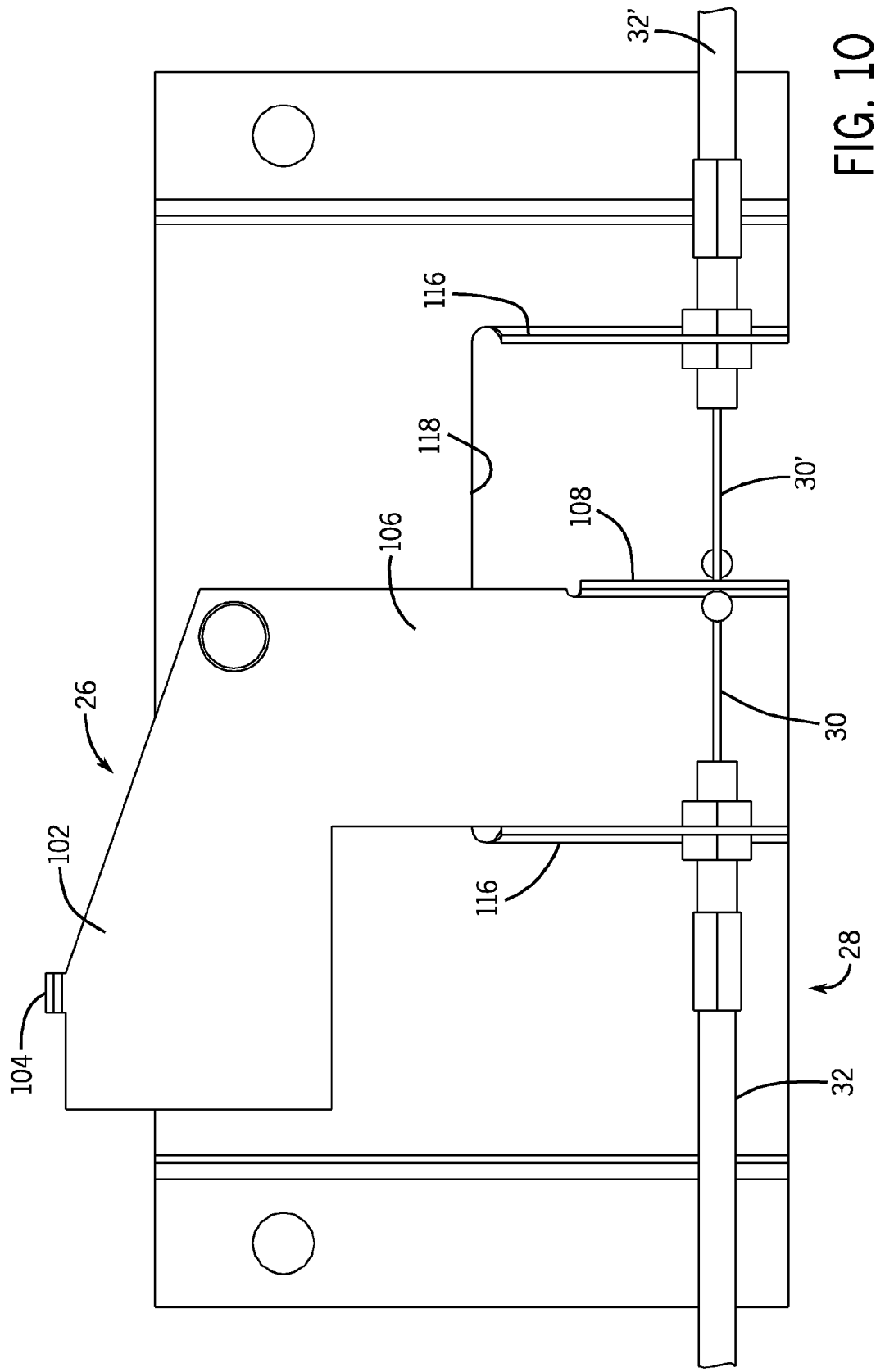
FIG. 10 is a partial top plan view is similar to FIGS. 6 and 8, showing an alternative arrangement for the actuating device incorporated in the mechanical safety braking device of the present invention.

Looking now at FIGS. 3 and 9, the opposite end of the sheath 32 is connected to a braking mechanism or assembly 34 disposed within the frame 12 adjacent a drive axle 36 of the motive system 16 for the unit 12. The driver axle 36 includes a pair of wheels 37 (one shown). The braking assembly 34 includes an outwardly extending flange 38, and a brake support 40 fixedly attached to the frame 12 near the drive axle 36, such as by connection to a vertically oriented internal plate member 41 secured to one of the transverse members of the frame 12. The flange 38 is fixed to the end of the brake support 40 opposite the point of attachment of the brake support 40 to the frame 12. In a preferred embodiment, the brake support 40 further includes an aperture 42 therethrough within which the drive axle 36 can be rotatably positioned. A bearing or bushing is mounted in the aperture 42, so as to enable rotation of drive axle 36 while maintaining the position of the inner area of brake support 40 inwardly of drive axle 36.

The brake support 40 also includes an opening 44 spaced from the aperture 42 opposite the point of attachment of the brake support 40 to the frame 12. A brake arm 46 is disposed within and extends through opening 44. The brake arm 46 is pivotally mounted to the brake support 40 by a pivot pin 48 that extends through the brake support 40 and across the opening 44, while also extending through a corresponding bore (not shown) within the brake arm 46.

At its inner end 50, the brake arm 46 includes an engagement plate 52 secured thereto in general alignment with the flange 38. The plate 52 includes a number of engagement apertures 54 that are also disposed in general alignment with corresponding sheath attachment openings 56 in the flange 38. Thus, the end of the sheath 32 opposite the actuator support 28 can be secured to the flange 38, while the end of the cable 30 extending from the sheath 32 can be extended through the opening 56 in the flange 38 and engaged with the aperture 54 in the plate 52. A biasing member 58, which may be in the form of a spring 60, is also positioned between the flange 38 and the plate 52 to bias the brake arm 46 away from the flange 38. The biasing member 58 may take a form other than a coil spring 60, such as a torsion spring or the like, so long as it functions to bias the brake arm 46 away from flange 38 with a desired degree of biasing force.

Opposite the plate 52, the brake arm 46 includes at least one engaging member 62 that is engageable with a stopping member 63 on the motive system 16 for the storage unit 10, which preferably is in the form of a disc 64 disposed on the drive axle 36, though other suitable structures for the stopping member 63 can also be used. The disc 64 is formed with an outer periphery or ring 66 including a number of engagement structures 68 thereon of that are shaped complementary to the engaging member 62 on the pivot arm 46. Also, the disc 64 is fixedly mounted to the drive axle 36, such that the disc 64 rotates in conjunction with the drive axle 36. Representatively, the engaging member 62 may be in the form of a tooth or key that is formed in the outer end of brake arm 46, and the engagement structures 68 on the disc 64 may be in the form of spaced apart outwardly extending cogs or teeth formed on the outer surface of disc 64, which are formed so as to define recesses within which the tooth or key in the outer end of brake arm 46 can be engaged.

Figure 7:
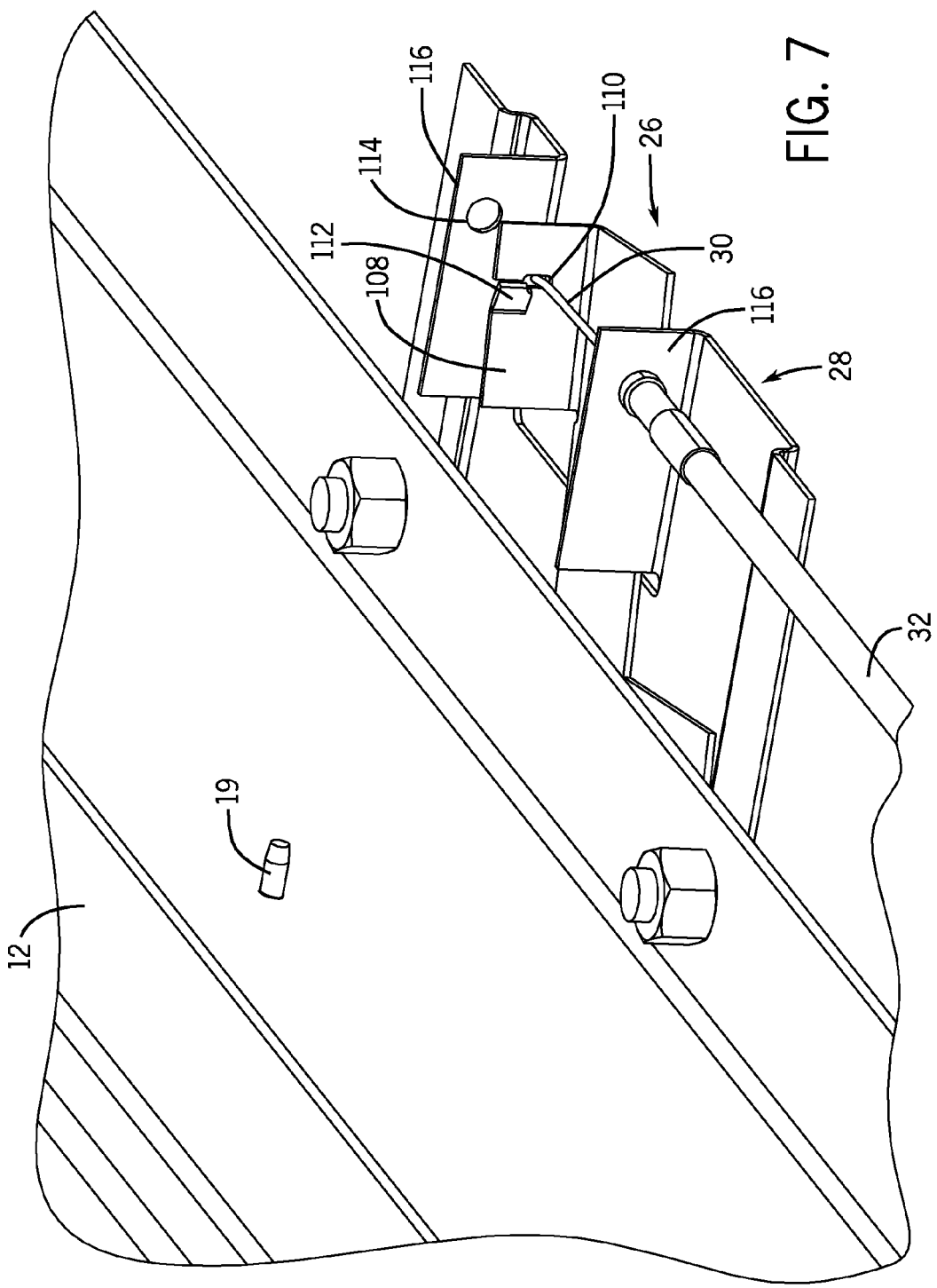
FIG. 7 is a partial isometric view of the actuating device of FIG. 5, showing the actuating device in an activated position.
Figure 8:
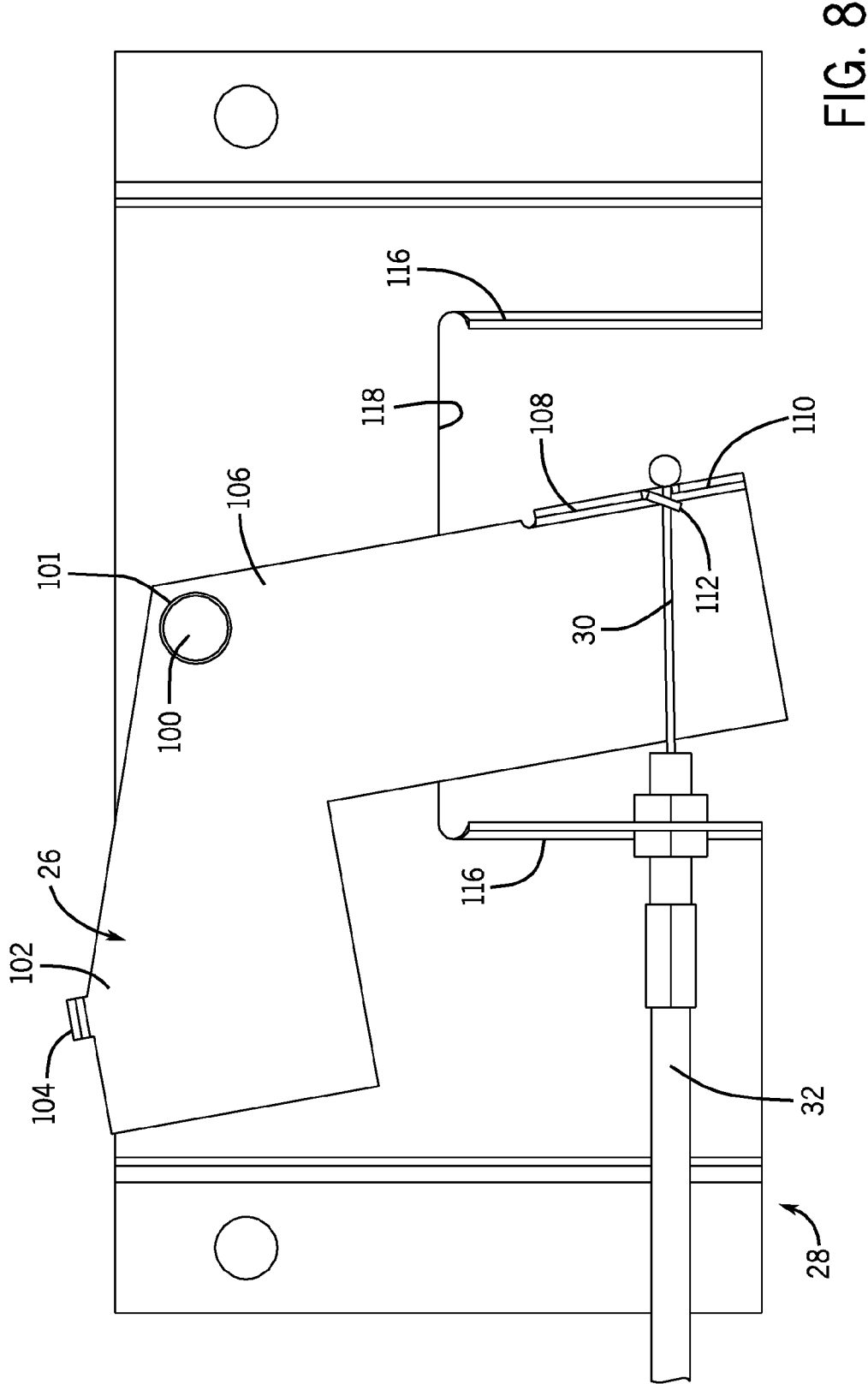
FIG. 8 is a top plan view of the actuating device of FIG. 7, showing the actuating device in the activated position.

In operation, when the storage unit carriage 14 is in motion, the drive axle 36 rotates in response to the operation of the motive mechanism 16, such as by operation of a hand crank or the like, to move the storage unit carriage 14 along rails (not shown) secured to a surface on which the storage unit carriage 14 rests. When the storage unit carriage 14 encounters an obstacle during movement, such as a person or other object that is between carriages that are being moved together, the safety device 10 is engaged by operation of the actuating member 18 coming into contact with the foot of the person, or with the lower area of the object, as one of the carriages 14 is moved toward another. When the actuating member 18 comes into contact with an object in this manner, the actuating member 18 is moved toward the storage unit frame 12 against the bias of the spring member 24. By pivoting the actuating member 18 against the frame 12, the actuating member 18 functions to move the pivoting actuator plate 26 inwardly with respect to the frame 12, as best shown in FIGS. 7 and 8. This action of the pivoting actuator plate 26 correspondingly pulls the cable 30 that is secured to the pivoting actuator plate 26 outwardly from the sheath 32, as a result of the connection of the cable 30 to the pivoting actuator plate 26. As the cable 30 is drawn outwardly from the sheath 32 by the movement of the pivoting actuator plate 26, the opposite end of the cable 30, which is secured to the engagement plate 52, is drawn towards the opposite end of the sheath 32, which is secured to flange 38. This, in turn, draws the engagement plate 52 toward the flange 38 against the bias of the biasing member 58, and functions to pivot the brake arm 46 about pivot pin 48. When brake arm 46 is pivoted in this manner, the engaging member 62 on the brake arm 46 is moved into engagement with one or more of the engagement structures 68 disposed on the disc 64 as the engagement structures 68 rotate into alignment with the engaging member 62 in response to rotation drive axle 36. The engagement of the engaging member 62 with one of the engagement structures 68 positively stops rotation of disc 64, and thereby the drive axle 36, and acts to quickly brake corresponding movement of the storage unit carriage 14. In a preferred embodiment, the engagement of the actuating member 18 and the engagement of the brake arm 46 with the disc 68 occurs virtually simultaneously.

In a preferred embodiment for the mechanical safety braking device 10, a maximum force of approximately five (5) lbs of force is required to be exerted on the actuating member 18 in order to activate the device 10. In addition, the engagement of the engaging member 62 with the engagement structures 68 is sufficient to completely stop the motion of the storage unit carriage 14 within a maximum stopping distance of 2-3 inches, while also allowing for a two (2) inch clearance between adjacent storage unit carriages 14 and the actuating members 18 on the adjacent unit carriages 14 when the carriages 14 are not in use. Further, it is contemplated that the mechanical safety braking device 10 can include an automatic reset (not shown) whereby the biasing member 58 can urge the pivot arm 46 and engaging member 62 out of engagement with the engaging structures 68 in the disc 64 upon removal of the required force on the actuating member 18.

While the above description covers the preferred embodiments of the mechanical safety device 10 of the present invention, other alternative embodiments are also contemplated as being within the scope of the invention. For example, the motive mechanism or system 16 on which the mechanical safety braking device 10 can be used can be either a mechanically or electrically driven system, so long as the pivot arm 46 and engaging structures 62 are configured to stop the rotation of the drive axle 36 within the required stopping distance tolerances. Also, the flange 38 and engagement plate 52 can be configured to be connected to one or more sheaths 32 and cables 30 such that one or more actuating members 18 can be present on a single storage unit carriage 14 at various locations around the carriage 14, or so that forces exerted on various sections of the actuating member 18 can be independently transmitted to the plate 38 by one or more of the cables 30 secured thereto.

Referring now to FIG. 13, the support plate 28 can be formed with guide flanges 116 disposed on opposite sides of the notch 118. With these multiple guide flanges 116, the cable 30 can be connected to the pivot arm 46, while the opposite cable 30' is operably secured to another actuating plate 18, with each cable also attached to the securing flange 108 in a stacked configuration. In this construction, when the actuating plate 18 connected to the cable 30' is contacted, the cable 30' is pulled in a direction that pivots the plate 26' in the same direction as if the actuating plate 18 connected to the cable 30 were contacted. This draws the cable 30 out of the sheath 32 to engage the pivot arm 46 with the disc 68. Thus, with this construction for the support plate 28 having the multiple guide flanges 116, multiple pivot plates 26' that are engageable by spaced actuating members 18 can be connected in series to enable the remote actuating members 18 to effectively activate the device 10 by pivoting each of the intervening plates 26'.

Various other alternatives are contemplated is being within the scope of the following claims particularly pointing out and distinctly claiming the subject matter regarded as the invention.

We claim:

1. A safety device on a mobile storage unit having a motive system including at least a pair of wheels driven by a drive shaft to move the storage unit, the device comprising:
   a) an actuating member adapted to be movably secured to the exterior of the mobile storage unit;
   b) a stopping member fixed to the drive shaft of the motive system;
   c) a braking device adapted to engage and cease the operation of the motive system for the mobile storage unit, the braking device including an engagement member adapted to engage the stopping member and halt the operation of the motive system for the storage unit and a biasing member engaged with the engagement member and operable to bias the engagement member away from the stopping member; and d) a connecting member operably connected between the actuating member and the braking device to move the engagement member into engagement with the stopping member fixed to the drive shaft of the motive system against the bias of the biasing member upon movement of the actuating member.

2. The device of claim 1 wherein the connecting member is mechanically connected between the actuating member and the engagement member.

3. The device of claim 2 wherein the connecting member is a cable.

4. The device of claim 1 wherein the stopping member is mechanically engageable with the engagement member to stop the rotation of the stopping member and the drive shaft of the motive system to which the stopping member is secured.

5. The device of claim 4 wherein the stopping member comprises a disc secured to the drive shaft of the motive system for the storage unit.

6. The device of claim 5 wherein the stopping member includes a number of engagement structures disposed on the stopping member that are engageable by the engagement member.

7. The device of claim 1 wherein the engagement member is affixed to the storage unit in a position where the engagement member is disposed generally parallel to the drive shaft of the motive system for the storage unit.

8. The device of claim 1 wherein the braking device further comprises a mounting bracket affixed to the storage unit and to which the engagement member is movably secured.

9. The device of claim 8 wherein the mounting bracket includes an aperture through which the drive shaft of the motive mechanism of the storage unit extends.

10. The device of claim 9 further comprising a bearing disposed within the aperture to facilitate the rotation of the drive shaft within the aperture.

11. The device of claim 8 wherein the engagement member is pivotally secured to the mounting bracket.

12. The device of claim 1 further comprising:
a) a plurality of actuating members movably secured to the exterior of a mobile storage unit; and
b) a plurality of connecting members each operably connected between one of the plurality of actuating members and the braking device to operate the braking device to move the engagement member into engagement with the motive system against the bias of the biasing member upon movement of the actuating member.

13. A storage system comprising:
a) a plurality of mobile storage units that are movably mounted with regard to one another, each of the plurality of mobile storage units including a motive system including at least a pair of wheels driven by a drive shaft to move the mobile storage unit independently of the remaining mobile storage units; and
b) a safety device disposed on each mobile storage unit, the device comprising:
  i) an actuating member movably secured to the exterior of the mobile storage unit;
  ii) a stopping member fixed to the drive shaft of the motive system;
  iii) a braking device that is engageable with the motive system for the mobile storage unit to cease the operation of the motive system for the mobile storage unit, the braking device including an engagement member that engages the stopping member and halts the operation of the motive system for the storage unit and a biasing member engaged with the engagement member and operable to bias the engagement member away from the motive system; and
  iv) a connecting member operably connected between the actuating member and the braking device to move the engagement member into engagement with the stopping member of the motive system against the bias of the biasing member upon movement of the actuating member.

14. The device of claim 13 wherein the stopping member is mechanically engageable with the engagement member to stop the rotation of the stopping member and the drive shaft of the motive system to which the stopping member is secured.

15. The device of claim 13 wherein the braking device further comprises a mounting bracket affixed to the storage unit and to which the engagement member is movably secured, wherein the mounting bracket includes an aperture through which the drive shaft of the motive mechanism of the storage unit can extend.

16. A method for operating a safety device for stopping by the movement of a mobile storage unit having a motive system including at least a pair of wheels driven by a drive shaft to move the storage unit that is part of a mobile storage system, the method comprising the steps of:
a) providing a safety device attached to the mobile storage unit including an actuating member movably secured to the exterior of the mobile storage unit, a stopping member fixed to the drive shaft of the motive system, a braking device that is engageable with the stopping member for the mobile storage unit to cease the operation of the motive system for the mobile storage unit, the braking device including an engagement member that engages the stopping member and halts the operation of the motive system for the storage unit and a biasing member engaged with the engagement member and operable to bias the engagement member away from the motive system, and a connecting member operably connected between the actuating member and the braking device to move the engagement member into engagement with the stopping member motive system against the bias of the biasing member upon movement of the actuating member;
b) actuating the actuating member on the exterior of the mobile storage unit; and
c) stopping the operation of the motive system for the mobile storage unit utilizing the engagement member.

17. The method of claim 16 wherein the step of stopping the operation of the motive system comprises moving the engagement member into engagement with the stopping member to stop the rotation of the stopping member and the drive shaft to which the stopping member is connected.

18. The method of claim 17 wherein the step of moving the engagement member comprises engaging the actuating member with sufficient force to overcome the bias of the biasing member.

19. The method of claim 16 wherein the connecting member comprises a cable mechanically interlocked with the actuating member at one end and the engagement member at the opposite end, and wherein the step of actuating the actuating member comprises pulling on the cable with the actuating member to pivot the pivot arm.

20. The method of claim 16 wherein the steps of actuating the actuating member and stopping the operation of the motive system occur simultaneously.

* * * * *